United States Patent [19]

Franzen et al.

[11] 4,213,557

[45] Jul. 22, 1980

[54] METHOD FOR PRODUCING A MASS FILTER ANALYZER SYSTEM AND ANALYZER SYSTEM PRODUCED ACCORDING TO THE METHOD

[75] Inventors: Jochen Franzen, Wildeshausen; Gerhard Weiss, Varrel, both of Fed. Rep. of Germany

[73] Assignee: Dr. Franzen Analysentechnik GmbH & Co. Kommanditgesellschaft, Bremen, Fed. Rep. of Germany

[21] Appl. No.: 935,132

[22] Filed: Aug. 21, 1978

[30] Foreign Application Priority Data

Aug. 23, 1977 [DE] Fed. Rep. of Germany ....... 2737903
Nov. 24, 1977 [DE] Fed. Rep. of Germany ....... 2752674

[51] Int. Cl.² ......................... B23K 1/02; C03B 23/04

[52] U.S. Cl. .................................... 228/122; 65/59 R; 65/60 C; 65/110; 228/265; 228/903

[58] Field of Search ............... 228/265, 124, 122, 903; 65/59 R, 59 B, 60 R, 60 C, 108, 110; 313/291

[56] References Cited

U.S. PATENT DOCUMENTS 2,592,614 4/1952 Stoddard ............................... 29/423
3,248,788 5/1966 Goldstein et al. ..................... 29/423
3,328,146 6/1967 Hanlein ................................ 65/60 C

*Primary Examiner*—Francis S. Husar
*Assistant Examiner*—K. J. Ramsey
*Attorney, Agent, or Firm*—Toren, McGeady and Stanger

[57] ABSTRACT

A method for producing a highly precise and inherently stable analyzer system for a multipole mass filter, wherein a tube of material that is electrically poorly conductive and thermally softenable is put over a core which is precise in size, has a higher expansion coefficient and has parallel grooves. The tube material is joined to the grooves of the core by heating and, subsequently, after cooling for the purposes of solidifying, is removed from the core with the impressed tube indentations. Before the tube is heated, layers of electrically higher conductive metallic components, which can be easily connected to the softenable tube material, are applied between the core and the tube in the region of the grooves. The layer material is connected to the tube material when the tube is softened and joined to the grooves of the tube. When removing the tube that has been shaped in this manner, the layers connected to the impressed tube indentations are also removed from the core. An analyzer system produced according to the inventive method is also disclosed.

7 Claims, 8 Drawing Figures

METHOD FOR PRODUCING A MASS FILTER ANALYZER SYSTEM AND ANALYZER SYSTEM PRODUCED ACCORDING TO THE METHOD

FIELD OF THE INVENTION

The present invention relates to a method for producing a highly precise and inherently stable analyzer system for a multipole mass filter, wherein a tube of material that is electrically poorly conductive and thermally softenable is put over a core which is precise in size, has a higher expansion coefficient and has parallel grooves. The tube material is joined to the grooves of the core by heating and, subsequently, after cooling for solidification, is removed from the core with the impressed tube indentations. The invention also relates to an analyzer system with high precision and inherent stability for a multipole mass filter, having a tube of material that is electrically poorly conductive and thermally softenable with tube indentations which are impressed by softening over a core that is true to size, has a higher expansion coefficient and has parallel grooves.

BACKGROUND OF THE INVENTION

The principle of operation of a highly precise and inherent stable analyzer system for a multipole mass filter, which is generally known as a multipole mass filter according to Paul, is described in the German Pat. No. 944,900.

A multipole usually consists of electrically conductive round or hyperbolic rods, the number of rods corresponding to the number of poles. A quadrupole, in particular, consists of four parallel electrically conductive round or hyperbolic rods. The rods are held in a parallel position relative to each other by means of one or several electrically insulating mounting members in the form of rings or cages which embrace the rods on the outside. The centers of the rods are arranged in a square when seen in cross-section.

It is required that these rods are parallel and free of distortion, that the distances between the diagonally oppositely located rods are equal and that these diagonals form a right angle. These requirements are especially high for those mass filters which are to be used in higher mass ranges, i.e. masses that are higher than 500 atomic mass units ($m>500$ u).

According to the equation $$m = \frac{4eV}{\omega^2 r_o^2 q} \quad (q = \text{const} \approx 0.7)$$

the ion mass m passed through the quadrupole filter is a function of the amplitude V and the angular frequency $\omega$ of the applied high frequency voltage, as well as of the distance of vertices $2r_o$ of the respective rods. To ensure that the difference of the passed mass at any two points in the quadrupole filter with an adjusted passing mass $m=1000$ u is not larger than 0.1 u, the relative deviation of the distance of vertices $$\frac{\Delta(2r_o)}{2r_o}$$

may be at most 1/20,000. In the case of a diagonal distance of vertices $2r_o$ of usually 8 mm, this results in a required accuracy of 0.4 $\mu$m.

For cylindrical rods with a two-point support, this value is already exceeded as a result of the natural bending under the influence of gravity. Accordingly, in such an arrangement of a multipole filter with pole rods and separate insulating holders, it is very difficult to meet the necessary accuracy requirements.

Therefore, the British Pat. No. 1,367,638 describes a filter which consists of a tubular, distortion-free and bending-resistant insulator with conductive surface coatings, wherein this filter is produced from an extruded ceramic tube with subsequent burning and partial coating of the inner surfaces with a conductive layer. However, the burning results in a shrinkage of the tube of approximately 10% and, therefore, does not meet the above-described requirements with respect to accuracy to size; accordingly, such a quadrupole filter is only used in the lower mass range as a residual gas analyzer.

The German Pat. No. 1,297,360 describes the production of highly precise glass tubes on a core with subsequent coating with metal of the indented inner surfaces to be used as a quadrupole system.

In this case, it is especially disadvantageous that the subsequent application of the conductive layer destroys the size retention ability of the analyzer tube. This is so because the quadrupole system, speaking in electrical terms, is a capacitor of the capacity C in which there is a high frequency voltage with the frequency $\nu=\omega/2\pi$ and the amplitude V. With the usual data of $C=50$ pF, $\nu=2$ MHz and $V=5$ kV, peak currents of $i=V\omega C=3$ A are flowing. Currents of this magnitude flow through the conductive layer and cause a voltage drop over the layer between the various points of the surface in the quadrupole. Thus, according to the above equation for the distance of vertices $2r_o$ and, considering the voltage V, a high precision must be demanded according to which the voltage at various points, under the conditions of the above stated numerical example, may at most deviate from its nominal value by 1/10,000, so that the resistance of one of the four conductive layers over its length may not exceed 0.1 $\Omega$. In a metal having a specific resistance of $10^{-5}\Omega$ cm which is used as a conductive layer metal, the length of the layer being approximately 20 cm and the width of the layer approximately 1 cm, a minimum thickness of the layer of 20 $\mu$m must be demanded and, according to the above statements, the precision of the thickness of the layer must be within the range of 0.4 $\mu$m . According to the present state of the art, such an accuracy cannot be achieved either electrolytically or by means of evaporating or coating.

SUMMARY OF THE PRESENT INVENTION

The present invention, therefore, is aimed at improving the known method as described above, while avoiding its disadvantages and, particularly, is directed at creating a highly precise and inherently stable analyzer which is free of distortion and bending for a multipole mass filter, wherein the adhesion of the layers or coatings of electrically conductive material to the softenable tube material are improved so that generally, in analyzer systems for multipole mass filters, highly precise and inherently stable electrodes can be created by using different types of metallic components for the layers that are to be connected to the tube material.

According to the present invention, this task is solved in a method of the above-mentioned type wherein before the tube is heated, layers of metallic components that are electrically highly conductive and can be easily connected to the softenable tube material are applied between core and tube in the region of the grooves. The layer material is connected to the tube material during softening of the tube and joining the tube to the grooves. Further, when removing the tube shaped in this manner, the layers connected to the impressed tube indentations are also removed from the core. An especially preferred embodiment provides that metal foils are used as layers which are placed in the grooves of the core before the tube is heated. The inventive analyzer system is preferably characterized in that foils of electrically highly conductive metal are connected to the tube in its interior at the tube indentations.

For a better understanding of the present invention, reference is made to the following datailed description and the accompanying drawings while the scope of the invention will be pointed out in the appended claims.

BRIEF DESCRIPTION OF THE DRAWINGS

FIG. 4 shows a cross-section through the quadrupole tube after removing, with foils melted on;

FIG. 7 shows a cross-section through the quadrupole tube removed from the core in the embodiment according to FIGS. 5 and 6 with the foils melted on.

DETAILED DESCRIPTION OF THE INVENTION

Figure 1:
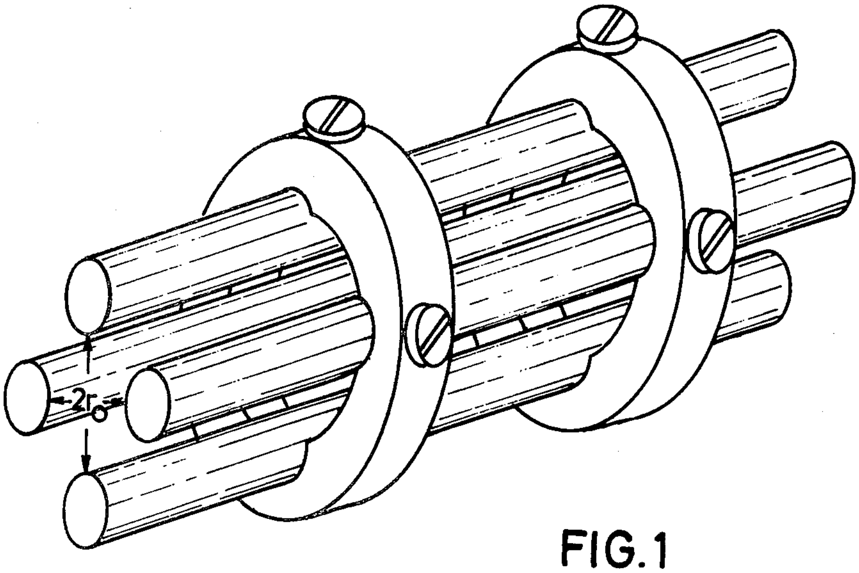
FIG. 1 shows a conventional quadrupole system consisting of four cylindrical rods which are held by means of insulating rings.

In the conventional quadrupole system shown in FIG. 1, four cylindrical conductive rods, particularly of metal, are held by two or more insulating rings. By mechanical adjusting, at best an accuracy of approximately 3 to 7 μm can be achieved. Due to natural gravity, due to vibrations, and due to the heating of the system, there is the danger that the rods will be bent. In addition, the system may be distorted.

Figure 2:
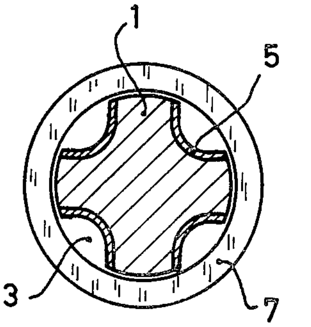
FIG. 2 shows a cross-section through the core with cut-in grooves, foils placed in the grooves and insulating tube put over the core.

According to the invention, shown in FIG. 2 is a prepared core 1, of a cut special steel and having semicircular grooves 3 cut into the core 1. The core 1 is provided with metal foils 5, in particular gold foils, by placing the metal foils 5 into the semi-circular grooves 3. Subsequently, a glass tube 7 is put over the core 1 provided with the metal foils 5 and, if necessary, the glass tube 7 is closed and evacuated.

Figure 3:
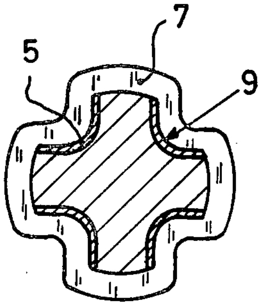
FIG. 3 shows a cross-section through the core with the insulating tube joined to the core and the foils melted to the tube.

Subsequently, the glass tube 7 filled with the core 1 is heated, for example, in a furnace to a temperature which is somewhat higher than the transformation point of the glass, and a pressure difference is generated between the outside and the inside of the glass tube, for example, by evacuation of the glass tube, whereby the glass tube 7 is placed on the metal foils 5 which are in the grooves 3 and the glass tube 7 joins to the metal foils 5 (see FIG. 3).

During cooling, the core 1 contracts more than the shaped glass tube 7 so that the core 1 can be easily removed from the shaped glass tube 7.

Figure 2A:
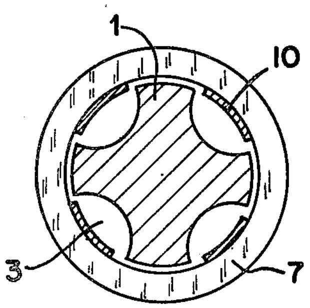
FIG. 2*a* shows a cross-section through the core showing an embodiment where foils are applied to the tube.

FIG. 2*a* illustrates another embodiment where foils 10 are applied to the inner portion of the tube 7 rather than the core.

Figure 4:
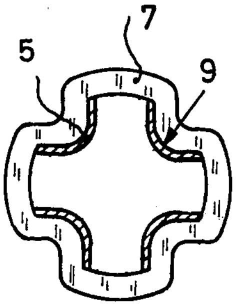

FIG. 4 shows the completely produced analyzer system for a quadrupole mass filter in the form of a glass tube 7 which is provided with tube indentations 9 whereby, in the interior of the glass tube 7, the metal foils 5 are joined onto the tube indentations 9.

Figure 5:
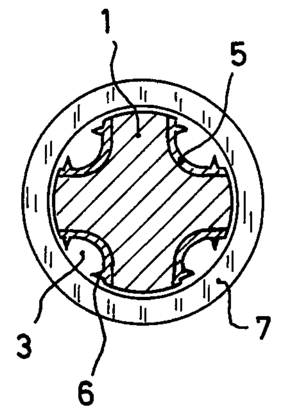
FIG. 5 shows, in a similar representation as in the embodiment shown in FIGS. 2 to 4, a cross-section through the core of a second embodiment with the grooves worked in to the core, the foils placed into the grooves and the insulating tube put over the core.
Figure 6:
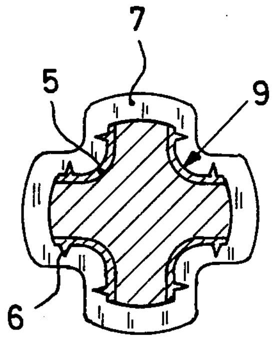
FIG. 6 shows a cross-section through the core of FIG. 5 with insulating tube joined to the core and with foils melted to the tube.
Figure 7:
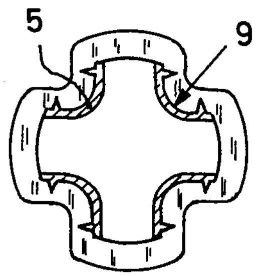

A second embodiment is shown in FIGS. 5 to 7. According to FIG. 5, a prepared core 1 which, in the shown embodiment consists of a cut special steel, with semicircular grooves 3 being cut into the core 1, is provided with metal foils 5 by placing them into the semicircular grooves 2.

On the sides facing away from the sectional core 1, the metal foils 5 are provided with flanges 6 which extend in the longitudinal direction and are arranged perpendicularly relative to the surface of the metal foil. A glass tube 7 is put over the core 1 which is provided with the metal foils 5 and, if necessary, is closed and evacuated.

Subsequently, the glass tube 7 which is filled with the core 1, is heated, for example, in a furnace, to a temperature which is somewhat higher than the transformation point of the glass, whereby the glass tube 7 is placed on the metal foils which are in the grooves 3. In this process, the flanges 6 are dug into the soft material of the glass tube (FIG. 6).

During cooling, the core 1 contracts more than the shaped glass tube 7, so that the core 1 can be easily removed from the shaped glass tube 7.

The metal foils 5 remain fixedly connected to the tube indentations 9 of the glass tube 7 which have been formed over the grooves 3 of the core 1, whereby the connection is reinforced particularly by the flanges 6 of the metal foils 5 melted into the glass tube 7.

FIG. 7 shows the completely produced analyzer system for a quadrupole mass filter in the form of a glass tube which is provided with tube indentations 9, wherein in the interior of the glass tube 7 metal foils are applied to the tube indentations 9 and are melted to the tube material particularly by means of their flanges 6.

The same method steps are carried out when, instead of the metal foils, burnished metal paste, conductive lacquer or a conductive coating are applied in a known manner at the locations where the tube indentations are to be formed before the sectional core is inserted into the tube of crude glass and are subsequently coated with metal in a known manner, wherein, in the case of a conductive coating, possibly an additional metal coating is applied in a conventional manner by means of electroplating.

The core 1 is then inserted into the tube 7 which is provided with the metal coatings in such a manner that the metal coatings are arranged over the grooves of the sectional core and are placed on the tube indentations 9 formed in the interior of the glass tube 7 in accordance with the above-described method steps.

As indicated above, various features form a part of the present invention in its various forms. One development of the present invention provides that the tube is evacuated before it is softened as a whole. This facilitates the joining of the softened tube to the grooves of the sectional core. A glass tube is a particularly preferred form of the tube material.

Another significant feature is that foil material having essentially the same thermal expansion coefficient as the tube material is used or that foils of a very ductile metal are used, so that the coating material will always assume the shape of the tube material during cooling. Gold and platinum are particularly suited as foil material.

Another further development of the present invention is distinguished by the fact that the foil surface, before it is placed in the grooves of the sectional core, is provided with a meltable coating in order to facilitate the melting. This facilitates the melting together of foil and tube material.

As discussed above, in the inventive method it can furthermore be provided for that the metal foils, before their application, are provided with projections which extend from that surface of the foil which faces away from the sectional core; and that the projections are essentially melted into the softenable material. Thus, the corresponding analyzer system is then distinguished by the fact that the metal foils are connected to the tube material essentially by means of projections which extend from the foil surface into the tube material.

For the metallic component discussed previously, a coating of a burnished metal paste is applied to the inner surface of the tube and the paste is converted to metal by means of higher temperatures. Alternatively, a coating of a conductive metal composition can be applied to the inner surfaces of the tube and the conductive metal composition is subsequently converted to metal.

During the final shaping process of the tube of softenable material, the metal electrodes are simultaneously shaped—particularly by being placed on the grooves of the core—and are pressed against the grooves by the surrounding tube material in order to achieve a highly precise and extremely smooth surface of the metal layer. By contrast, in the known method according to the German Patent No. 1,297,316, the coating with metal is performed only after the analyzer tube is shaped on the sectional core whereby, as explained, a sufficient accuracy is not guaranteed.

Other significant features of the invention cover the arrangement where the projections of the foils are flanges that have been folded over; where the projections are indentations of the foils; where the projections are ribs soldered or welded to the foils; or where the projections are wires soldered or welded to the foils.

With respect to the metallic component, burnished gold or burnished silver can be used as the metallic component. A conductive metal composition can also be arranged by applying a conductive lacquer drying the conductive lacquer. This conductive lacquer can be applied by painting, spraying or immersing.

Finally, the conductive layer can be applied by means of coating with metal through reduction. A final metal layer can be applied by means of electroplating. Particularly gold, silver, or copper but also, according to a preferred embodiment, tin in the form of tin oxide by means of the immersion process, can be applied as conductive metals.

While the foregoing description and drawings represent the preferred embodiments of the present invention, it will be obvious to those skilled in the art that various changes and modifications may be made therein without departing from the true spirit and scope of the present invention.

I claim:

1. A method for producing a highly precise and inherently stable analyzer system for a multipole mass filter comprising the steps of:

providing a core of precise size with parallel grooves therein;

providing a tube made of electrically poorly conductive and thermally softenable material;

placing electrically highly conductive metal foils, particularly of a metal which easily joins to the softenable tube material, into said grooves of said core;

disposing said tube over said core having said metal foils in said grooves, said core having a higher expansion coefficient than said tube;

heating the tube material and core so that said metal foils are joined to said softened tube material when said tube is softened and conforms to the configuration of said core;

cooling said heated tube and core until said tube material solidifies; and removing said tube from said core, said metallic foils connected to impressed indentations of said tube formed by said core being removed at the same time together with said tube.

2. A method according to claim 1, wherein said tube is evacuated before softening.

3. A method according to claim 1 or 2, wherein glass is used as said electrically poorly conductive tube material and a metal, particularly a highly ductile metal, having essentially the same thermal expansion coefficient as the tube material, is used as foil material.

4. A method according to claim 1, including the step of providing, on the surface of said foil, before being placed into said grooves of said core, a meltable coating, particularly of glass, in order to facilitate the joining.

5. A method according to claim 1, including the steps of providing said metal foils, before being inserted, with projections which extend from that surface of said foil which faces away from said core, said projections being joined to the softenable material during said heating step.

6. A method for producing a highly precise and inherently stable analyzer system for a multipole mass filter comprising the steps of:

providing a core of precise size with parallel grooves therein;

providing a tube made of an electrically poorly conductive and thermally softenable material;

applying a coating of a paste containing metal, such as burnished gold or burnished silver, to the inner surface of said tube;

disposing said tube having said coating at its inner surface over said core, said core having a higher expansion coefficient than said tube;

heating the tube material and core so that said paste is converted to metal which is joined to said softened tube material when said tube is softened to conform to said core and is joined to said grooves;

cooling said heated tube and core until said tube material solidifies; and removing said tube from said core, the metallic coating, connected to impressed indentations on said tube formed by said core, being removed at the same time together with said tube.

7. A method for producing a highly precise and inherently stable analyzer system for a multipole mass filter comprising the steps of:

providing a core of precise size with parallel grooves therein;

providing a tube made of an electrically poorly conductive and thermally softenable material;

providing a coating of a conductive metal composition, such as conductive lacquer, gold, silver, copper or tin applied as tin oxide, by means of immersion, to the inner surface of said tube;

disposing said tube having said coating at its inner surface over said core, said core having a higher expansion coefficient than said tube;

heating the tube material and core so that said conductive metal composition is joined to said softened tube material as a metal when said tube is softened to conform to said core and is joined to said grooves;

cooling said heated tube and core until said tube material solidifies;

removing said tube from said core, the metallic coating, connected to impressed indentations on said tube formed by said core, being removed at the same time together with said tube.

* * * * *